Jan. 12, 1960     P. HOLLERT     2,920,883
LEAF-SPRING SUSPENSION FOR VEHICLES
Filed April 3, 1957
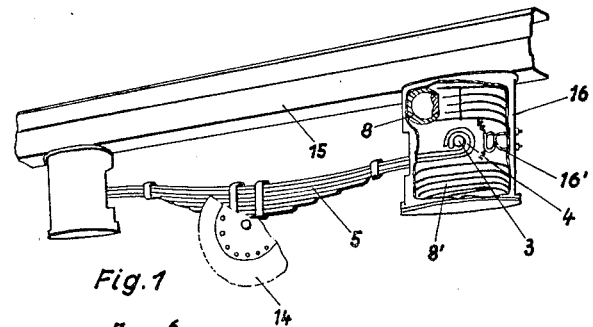
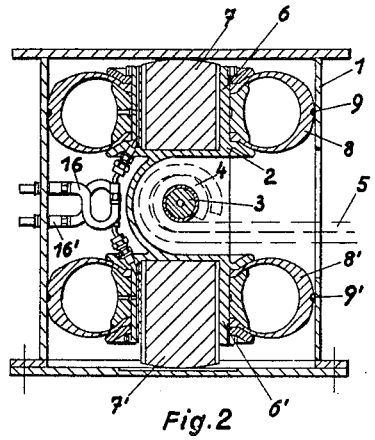
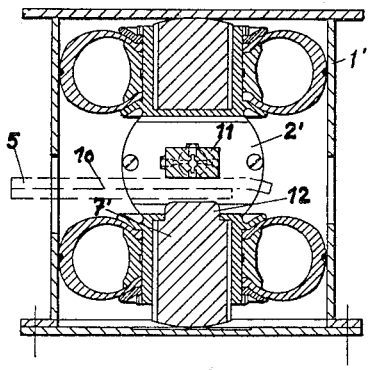
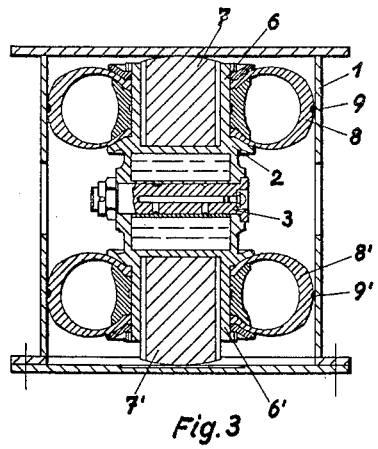
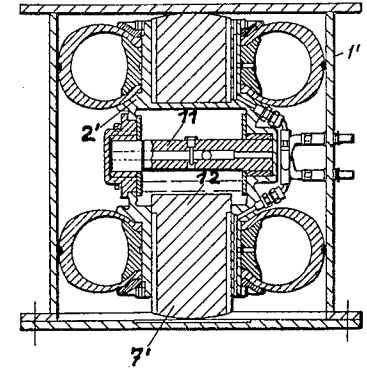
INVENTOR.
Paul Hollert
BY
Jones, Darby & Robertson

2,920,883

LEAF-SPRING SUSPENSION FOR VEHICLES

Paul Hollert, Dusseldorf, Germany

Application April 3, 1957, Serial No. 650,406

Claims priority, application Germany April 10, 1956

4 Claims. (Cl. 267—30)

This invention relates to a leaf-spring suspension system for vehicles and more particularly is concerned with a leaf-spring suspension system to be used for motor vehicles in which system the leaf spring is suspended elastically at its ends in a vertical or a horizontal position or in longitudinal direction with elastic rubber pads interposed at the points of suspension. A known arrangement of this kind consists therein that the hinge pin is directly borne in elastic rubber elements absorbing elastically the vertical as well as the horizontal efforts. In this arrangement of parts, the rubber elements also take up the dead load of the vehicle and are consequently the more compressed the greater a dead load the vehicle has. It is of course quite natural that the rubber elements thereby lose a considerable amount of their elasticity with respect to horizontal forces when in such compressed state.

The invention has therefore for its object the provision of an improved design of the known spring suspension system. The advantageous feature of the improved spring suspension system constructed and conceived in accordance with the invention consists therein that the dead load is eliminated from acting so as to ensure that the elasticity of the rubber elements is fully maintained independently of the load of the vehicle.

According to the invention, this object is accomplished thereby that a bearing body receiving the end of the spring and located in a housing that is attached to the frame of the vehicle comprises supports made of rubber for the absorption of forces primarily due to dead loads, and also is equipped with annular rubber elements provided to guide the bearing body in its housing and to absorb horizontal efforts arising between the bearing body and the body of the vehicle. Thus, vertical efforts and lateral component forces are absorbed by separate rubber elements, any contact of metal parts between the bearing body and the vehicle frame being avoided.

The annular rubber elements are advantageously designed as air filled hollow bodies, preferably in the way of tubeless tires.

The spring suspension system constructed according to the invention can be used with solid journal bearings as well as with sliding spring bearings.

Two embodiments are represented by way of example in Figs. 1 to 5 of the accompanying drawings.

In the drawings:

Fig. 1 shows the arrangement of the spring suspension on the vehicle frame;

Figs. 2 and 3 represent a solid journal bearing in elevation and side view, and

Figs. 4 and 5 show similar sectional views of the spring suspension system constructed according to the invention as applied to a sliding spring bearing.

In the embodiments selected for illustration, Fig. 1 shows a part of a wheel hub 14 with a leaf spring 5 secured to its axle. The housings 1, 1' of the solid journal bearing and the sliding spring bearing described herein below are mounted on the vehicle frame 15.

A bearing body 2 is located in the housing 1 which is securely mounted on the vehicle frame 15. The eyelet 4 of the spring 5 is borne on a journal pin 3 inside the bearing body 2. Cylindrical extensions 6, 6' of the bearing body 2 receive co-axially arranged rubber supports 7, 7' which butt against the housing 1 on top and bottom. These supports 7, 7' absorb the vertical component forces, particularly, the dead load of the vehicle.

The cylindrical parts 6, 6' of the bearing body 2 are shaped to have the form of hollow hubs each of which serves to receive one hollow rubber body resembling the principle and shape of a tubeless tire which in well known manner is inflated with air. The pipe stubs 16, 16' fitted in conventional manner with appropriate valves and provided for the inflation of the hollow rubber bodies 8, 8' are so arranged as to be accessible from the outside of the housing 1. A graphited cord ring in contact with the side wall of the housing 1 is embedded in the hollow rubber bodies 8, 8' and assumes the function of a slip ring. Horizontal efforts arising between the bearing body 2 and the vehicle frame or the housing 1 respectively are absorbed by the tire shaped elastic rubber bodies 8, 8' which are not stressed by vertical loads and therefore maintain their full elasticity even in case of heavy dead load of the vehicle. The graphited cord rings 9, 9' ensure a good sliding contact of the rubber bodies 8, 8' in the event of vertical movements of the housing 1.

In the sliding spring bearing represented schematically in Figs. 4 and 5, the structural set up of which is based on the same principle as described in conjunction with Figs. 2 and 3, the flat end 10 of the spring 5 is in a sliding contact with a slide 11 and an upwardly projecting elongated portion 12 of the rubber support 7' both of which are located in the bearing body 2', so that the end 10 of the spring rests on a rubber surface and consequently cannot cause any noise.

The rubber bodies 8, 8' take up elastically tilting and tangential stresses of any directions, while the dead load and all vertical efforts are asborbed by the rubber supports 7, 7'.

I claim:

1. In a leaf spring suspension for vehicles in which the spring end engages the vehicle chassis through the intermediation of elastic rubber means, that improvement therein, comprising, first and second circular inflatable tire-like members spaced apart vertically, first and second rigid hollow hubs for said first and second members respectively, first and second rubber support blocks in said hubs projecting upwardly and downwardly from said first and second tire-like members respectively, a bearing body of smaller diameter than said tire-like members connecting said hubs between said support blocks, a spring end engaging formation carried by the bearing body for engaging a spring end, and a housing therefor for attachment to a vehicle frame for relative movement with respect to the bearing body and spring end, said housing having sides abutting the tire-like elements and being adapted to receive the spring end thereinto to engage the spring end engaging formation of said bearing body, whereby the bearing body and the spring end float elastically in the housing and transmit horizontal stresses through the tire-like members and vertical stresses through the said support blocks.

2. A spring suspension according to claim 1 wherein said spring end engaging formation is a bearing pin in the bearing body for engaging an eyelet of the spring.

3. A spring suspension according to claim 1 wherein said spring end engaging formation of the bearing body engages the end of the spring slidingly.

4. In a leaf spring suspension for vehicles in which the spring end engages the vehicle chassis through the intermediation of elastic rubber means, that improvement therein, comprising, a housing for attachment to a vehicle frame, said housing having sides and upper and lower walls, first and second parallel annular horizontally expansible and contractible rubber members vertically spaced apart in said housing and engaging the sides thereof, first and second hollow hubs for said first and second members respectively, said hubs mounting first and second vertically extending rubber support blocks engaging said upper and lower walls of said housing respectively, a bearing body spaced horizontally from said housing side and connecting said hollow hubs, and a spring engaging formation within the bearing body, the housing being apertured to receive a spring end to engage the spring end engaging formation of the bearing body.

References Cited in the file of this patent

UNITED STATES PATENTS

| | | |
|---|---|---|
| 1,169,624 | Dryer | Jan. 25, 1916 |
| 1,596,744 | Leipert | Aug. 17, 1926 |
| 2,469,158 | De Frees | May 3, 1949 |
| 2,694,606 | Etzkorn | Nov. 16, 1954 |
| 2,733,059 | Van Raden | Jan. 31, 1956 |